(No Model.)

G. H. STALLMAN.
MEAT CUTTER.

No. 412,557. Patented Oct. 8, 1889.

Attest
H. Smith

Inventor
Granville H. Stallman
by Wm. Hubbell Fiske, Atty.

UNITED STATES PATENT OFFICE.

GRANVILLE H. STALLMAN, OF CINCINNATI, OHIO, ASSIGNOR TO THE MURRAY IRON WORKS COMPANY, OF IOWA.

MEAT-CUTTER.

SPECIFICATION forming part of Letters Patent No. 412,557, dated October 8, 1889.

Application filed May 4, 1889. Serial No. 309,630. (No model.)

*To all whom it may concern:*

Be it known that I, GRANVILLE H. STALLMAN, a citizen of the United States of America, and a resident of the city of Cincinnati, in the county of Hamilton and State of Ohio, have invented certain new and useful Improvements in Meat-Cutters, of which the following is a specification.

The improved meat-cutter hereinafter described is designed for cutting or mincing meat preparatory to making sausage and minced meats.

The paramount object of my invention is to sever the rough and crude mass to be cut into minute portions without mangling or crushing the individual particles. It is a recognized fact that the efficiency of the machine for the above-described purpose depends upon its ability to distinctly and clearly sever the partially-cut material from the size of a pea down to the desired minuteness. To cut the rough and crude mass in the size of a pea is readily accomplished; but to cut it into smaller particles without mashing them is an object difficult of attainment. My invention accomplishes this object in an eminent degree.

The several features of my invention and the advantages resulting from their use, conjointly or otherwise, will be apparent from the following description and claims.

Figure 1:
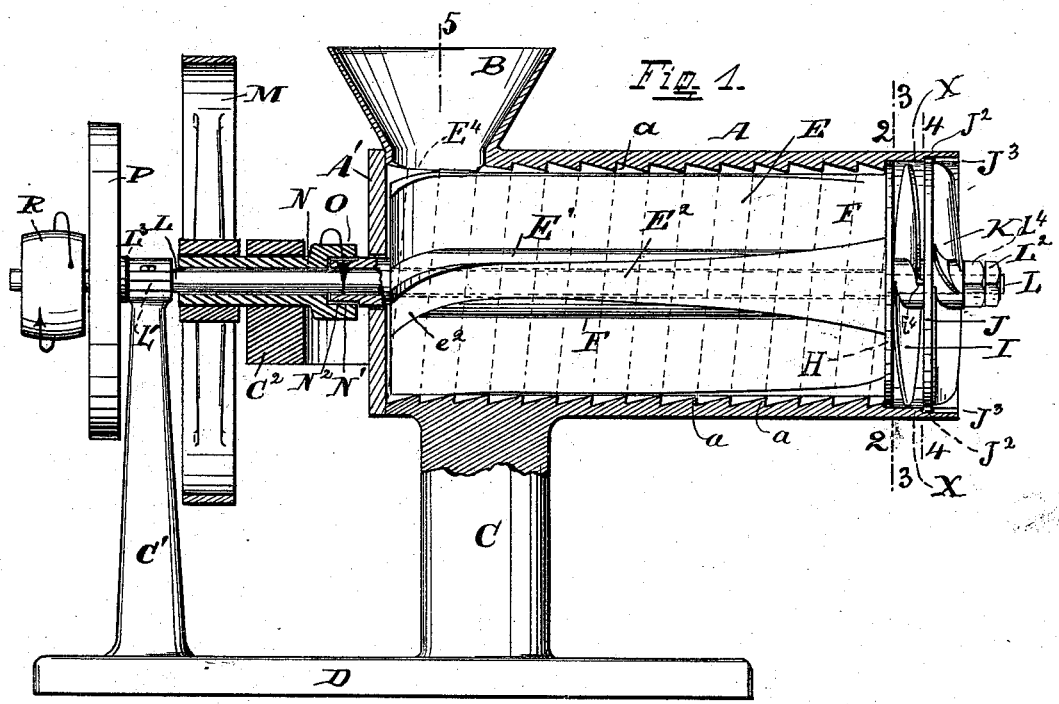
Figure 2:
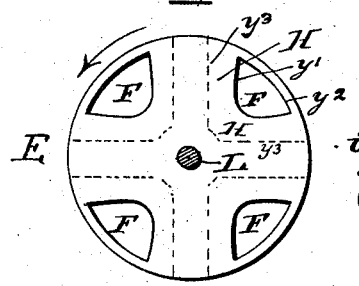
Figure 3:
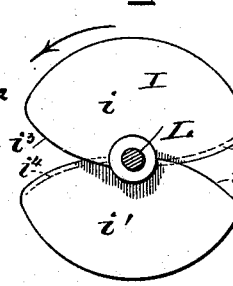
Figure 4:
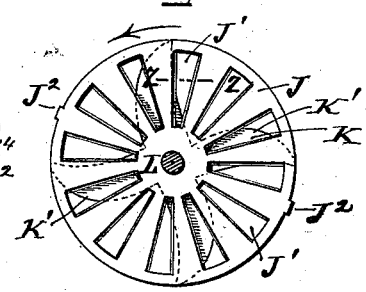
Figure 5:
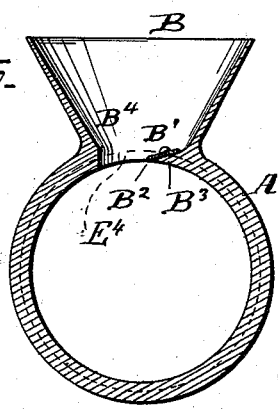
Figure 6:
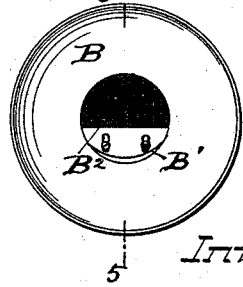
Figure 7:
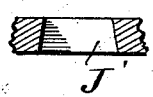

In the accompanying drawings, forming part of this specification, Figure 1 is a vertical central longitudinal section of a meat-cutter illustrating my invention, the supporting-frame and one of the pulley-wheels being shown in elevation. Fig. 2 is an end elevation of the meat-conveyer, taken in the plane of the dotted line 3 of Fig. 1 and looking from right to left. Fig. 3 is a side elevation of the conveyer-knife, looking from left to right in Fig. 1. Fig. 4 is a side elevation of the retaining-comb, looking at it from left to right in Fig. 1, the view being taken at the surface lying in the plane of dotted line 4 of said Fig. 1. In this Fig. 4 is shown, partially by dotted lines and partially by solid lines, the mincing-knife, being located against the rear end of the conveyer. Fig. 5 represents a vertical central section of the shell of the meat-cutter and of the hopper connected thereto and of the preliminary cutting-knife, the function of which knife will be hereinafter more fully described. Fig. 6 is a top view of the hopper, showing this preliminary cutting-knife located at the bottom of the hopper. Fig. 7 is a detailed transverse section of the comb, taken at the line $z\ z$ of Fig. 4.

In connection with Fig. 6 it will be observed that the section shown in Fig. 5 is taken at the dotted line marked 5 5 of Fig. 6, as well as that marked 5 in Fig. 1.

The operating parts of the meat-cutter are to be supported upon any suitable framework, and preferably the frame consists of a base, as D, a supporting-column C, for upholding the shell of the meat-cutter, and a second supporting-column C', upholding the journal-bearing receiving the outer end of the central operating-shaft of the cutter. The shell or cylinder of the meat-cutter is rigidly connected to the supporting-column C. The interior surface of this shell is provided with a series of spiral threads $a$. In forming these threads the preferable method is first to bore out the interior of the shell A, so that its inner surface shall be entirely smooth and true. These series of spiral threads $a$ are next formed therein by a proper tool, preferably with a pitch equal to about one-fourth the diameter of the shell. In this way I obtain a series of threads whose inner edges form a true cylinder. The interior of the outer end of the shell or cylinder is counterbored somewhat larger than the depths of the threads to admit of knives extending beyond the depth of the threads in order to effectually cut at all points the meat as it is fed to them. This counterbored space is indicated in Fig. 1 by the lines $x\ x$. At the top portion of the feeding or inlet end of the shell is located a feeding-hopper B. Within the opening connecting the hopper to the interior of the shell A is located the preliminary cutting-knife B'. This knife B' preferably consists of a cutting-blade B², supported on a fixed support or ledge B³, rigidly fixed to the shell and preferably integral therewith. The cutting-edge of the stationary knife B' is parallel with the axial line of the shell, and its under side is a continuation of the shell extending a short distance across the diameter of the hopper, as shown in Figs. 5 and 6.

Within the shell A is located the conveyer E. This conveyer consists of a central portion E' concentric with the longitudinal axis of the shell. From this central portion E' radially project a series of wings or blades $E^2$. These wings or blades extend outwardly until they meet the threads $a$, the surfaces of these wings being accurately fitted to the bore of the shell. Those portions $e^2$ of the wings $E^2$ directly under or opposite the hopper-opening $E^4$ stand obliquely to the axial line of the conveyer E and gradually become parallel to one another. At the point where they become parallel to one another they terminate. The several corrugations or channels F, formed by the wings or blades $E^2$, diminish in depth and width as they approach the discharging end of the shell A, so that their area at the point where they terminate is preferably about one-half of that of their area in the neighborhood of the section-line 5, heretofore mentioned. The relative area of these corrugations at their discharging terminus, as compared with their area at the line 5 5 of Fig. 1, is shown in Fig. 2, where the solid lines $y'$ $y^2$ indicate the area of the corrugations at their discharging terminus, while the dotted line $y^3$ and solid line $y^2$ indicate their area at the line 5, heretofore mentioned. The discharging terminus of this winged conveyer E is provided with the plate H. This plate is rigidly attached to the winged conveyer. The plate is preferably made of steel, and that surface of it which is on the opposite side from the surface next to the end of the conveyer is smooth and true. The object of making plate H of steel, and thus smooth and true, is that it shall form a complementary bearing-surface, against which the rotating member of the knife I rotates. That end of the winged conveyer which is beneath the hopper is provided with an extension $N^2$, passing through and fitting closely within the otherwise closed end A' of the shell A. The outer end of this extension $N^2$ is connected to and engaged by means of a screw or clutch coupling N' to sleeve N. Fixed upon the end of the sleeve which is opposite to the one forming hub O on the extension N' of the clutch-coupling aforementioned is the pulley M, rigidly connected to and concentric with said sleeve N. This sleeve N is journaled in the bearing $C^2$, forming a part of the supporting-frame and herein shown as integral with the column C.

Through the center of the winged conveyer and the sleeve N passes the shaft L. This shaft is supported in the bearing L' and upheld by the column C' or equivalent support. This shaft L rotates freely within and independent of and in a direction opposite to the winged conveyer E and of sleeve N. Within the shell A this shaft L is supported by journal-bearings in the winged conveyer E, one of these journal-bearings being located at one end of the conveyer and the other journal-bearing being located at the other end of said conveyer. Between these two journal-bearings the shaft is not in contact with the surfaces of the conveyer, the portion E' of the said conveyer being cored out, so as to leave a space between the conveyer and the shaft. On the left-hand end or portion of the shaft L is preferably fixed a fly-wheel P, and also a pulley R, substantially as shown.

In the discharging end of the shell A, and immediately beyond the end of the winged conveyer, is the knife I, heretofore referred to, which is fixed upon the shaft L. This knife consists of propeller-blades $i$ $i'$. The cutting-surface of the knife $i$ is the edge $i^3$, and the cutting-surface of the knife $i'$ is the edge $i^2$, and the cutting-surfaces $i^2$ $i^3$ of their respective knives bear against that surface of plate H which is shown in Fig. 2; hence it will be observed that while the arrows showing the direction in which this knife I revolves and the direction in which the plate H revolves are on the drawings in the same direction, the fact that that face shown in Fig. 3 lies against that face of the plate H shown in Fig. 2 indicates a fact—namely, that the knife I revolves in a direction opposite to that in which the plate H revolves. That portion of the propelling-knife which is next to the retaining-comb J is provided with a slight projection $i^4$. (Shown in Fig. 1 by solid lines and by dotted lines in Fig. 3.) The comb J is secured so that it cannot rotate, but can nevertheless slide forward and backward. The preferred means for accomplishing these ends is a series of longitudinal grooves $J^3$ in the counterbored portion of the shell A. The periphery of the comb is provided with corresponding lugs $J^2$ $J^2$, which respectively enter the corresponding recesses in the shell A, thereby permitting the comb to slide within the counterbore in the direction of the length of the shell, but prevent the said comb from rotating. The function of this projection $i^4$ is to clean the adjacent surfaces of the retaining-comb against which said projection $i^4$ bears. The retaining-comb is of a discal form and provided with radial apertures J'. One edge of each of these radial apertures forms a complementary cutting-edge or bearing, against which the meat is held while the rotating or cutting knife K is moving over it, and by means of which it severs off the particles of meat through and beyond the apertures J'. The retaining-comb is inserted in the counterbore of the shell A, and is there fixed to the shell and is stationary therewith, the shaft L turning loosely within it.

Against that side of the comb which is on the right hand in Fig. 1 is the knife K, fixed upon that portion of the shaft L which projects to the right beyond said comb. The shape of this knife is shown in Figs. 1 and 4. It consists of radial cutting-blades, whose cutting-edges K' are curved substantially as shown. These cutting-edges bear against the adjacent surfaces of the comb J and cut off the particles of meat fed through the comb from the conveyer-knife. The end of shaft L at the right side of the knife K is provided with the nut $L^4$ and the lock-nut $L^2$, whereby the knife K is securely held in its proper position for cutting against the comb. The shaft is prevented from slipping longitudinally by any of the usual well-known means. One description of such means is shown in the drawings in Fig. 1 and consists of the set-collar $L^3$. The knife I and also the knife K are fixed to the shaft in any suitable manner, preferably by means of the usual keyway and feather.

Having described the various portions of the machine embodying my invention, I will now proceed to describe the mode of operation of my device. The shaft L is rotated by means of power applied to it, preferably, through the pulley R, heretofore described, the rotation of the shaft being in the direction of the arrow around pulley R. (Shown in Fig. 1.) By this shaft the knives I and K are also rotated. The conveyer E is now rotated through suitable agency, as the pulley M and its connections aforementioned, the conveyer rotating in the direction of the arrow shown around the hub O in Fig. 1. The direction in which the conveyer E rotates is, as will be apparent from the drawing, opposite to the direction in which the shaft L and the knives I and K rotate, and, as indicated by the relative size of the pulleys R and M, the speed of the shaft L and its knives I and K is much greater than the speed at which the conveyer E revolves. The preferred relative speed of the conveyer in relation to the shaft L is as five to one. The meat to be cut need not be cut in as small portions as is customarily the case prior to its being placed within the hopper, but in an exceedingly coarse condition, or in chunks, can be placed in the hopper. After being placed therein its weight carries it down to the preliminary cutting-knife B', and through the orifice $E^4$ against the winged conveyer, and, as the conveyer revolves, the meat is brought directly in front of and against the preliminary cutting-knife B'. The revolution of the conveyer causes the knife B' to sever that portion of the meat which has passed beyond its edge, and this portion is now within one of the corrugations of the conveyer. This operation of cutting off the meat has this decided advantage over the ordinary method of feeding the meat to the shell, in that the meat is not jammed against the edge of the hopper and the hopper is not choked. The oblique portions $e^2$ of the wings $E^3$ cause the operation of the preliminary cutting-knife to be that of a shearing cut. The meat within the conveyer lies in the corrugations between the adjacent wings. The rotating movement of the wings, together with the pressure of that wing which presses forward the adjacent meat, causes the meat to be pressed against the interior surface of the shell A, and the threads $a$ of the shell A enter the partially-cut meat. The forward movement of the meat will then be continued by means of the inclination of the threads of the shell, and the meat gradually advances toward the discharging end of the conveyer. It will be observed that in this process the meat is not forced forward by the conveyer acting against the meat as a forcing-screw, but is moved forward through the agency of and parallel to the inclined threads of the shell. By this means the meat is not subjected to a crushing or mangling process, as would be the case were it subjected to the action of a conveyer in the form of a screw acting against a series of ribs in the interior of the shell, where the screw is the sole propelling agency, and crushing all the meat between itself and these ribs before it reaches the points in the conveyer where it is first cut by knives; but, on the contrary, by my device, inasmuch as the meat is gradually and gently fed forward by means of the threads on the interior of the shell, and as the wings of the conveyer are not of a form to induce the meat to be drawn between the conveyer and the ribs on the shell, the meat in shell A is preserved in an unmacerated condition during its progress through the conveyer, and is presented to the cutting-knives in a solid and compact condition. On reaching the delivery end of the conveyer the meat, as it passes beyond the plate H, is cut by the rotating knife I in the manner described. That portion of the meat protruding from the conveyer is severed by the knife I, and is then carried forward by the inclined blades of the knife and delivered to the apertures of the comb. The meat is forced forward by the continued revolution of the knife through the apertures, and as it protrudes through the comb is cut off by the rapidly-rotating knife K. This knife reduces the already partially-cut meat to the desired degree of fineness. This knife K rotates rapidly on the outside of the comb.

It is here desirable to observe an automatic feature of these knives. As the knife I rapidly revolves it crowds the meat between its inclined revolving blades and the comb J. This operation tends to wedge or force the cutting-blades of the knife against the adjacent surfaces of the plate H, and thereby renders the knife at all times efficient in its function of cutting the meat. At the same time that the knife I is thus forced against the surfaces of the plate H there is evidently a corresponding pressure in the opposite direction against the comb J, which, being allowed to move longitudinally in the shell A, is forced against the rotating knife K, located at the outside thereof, and thus always puts this knife and that surface of the comb which is adjacent to this knife in the position for properly cutting the meat as it passes through the radial apertures J'.

While the various features of my invention are preferably employed together, one or more of said features may be used without the remainder, and, in so far as applicable, one or more of said features may be used in connection with meat-cutters other than the one herein specifically specified.

What I claim as new, and desire to secure by Letters Patent, is—

1. In a meat-cutter, the shell A, provided with a conveyer having radial wings lying for part of their length parallel to the shaft L and for part of their length—namely, that portion which is under the hopper—obliquely to the axis of the shell A, the shell A being provided with threads $a$, and the hopper provided with preliminary cutting-knife B', substantially as and for the purposes specified.

2. In a cutter, the shell A, provided with comb J, having apertures J', and the propeller-knife I, having inclined blades provided with cutting-edges on the one hand and projections or flanges $i^4$ on the other, these projections or flanges bearing against the said comb J, substantially as and for the purposes specified.

3. In a meat-cutter, the shell A and the longitudinal adjustable comb, and the rotating cutting-knife K, provided with curved edges located on the outer side of said comb and rotated by shaft L, and the rotating knife I, also rotated by shaft L, provided with projections $i^4$, and at the other end provided with the curved cutting-edges bearing against the cutting-plate H, substantially as and for the purposes specified.

4. In a meat-cutter, the shell A and the longitudinal adjustable comb, and the rotating cutting-knife K, provided with curved edges located on the outer side of said comb and rotated by shaft L, and the rotating knife I, also rotated by shaft L, provided with the curved cutting-edges bearing against the cutting-plate, substantially as and for the purposes specified.

5. In a shell A, the longitudinal adjustable comb having openings, and the exterior rotating knife K, and the interior knife I, having inclined blades, and the comb having apertures narrowing toward their exit for enabling the mass of meat compressed through the apertures by means of knife I to be compacted as it issues from said apertures to the exterior cutting-knife K, substantially as and for the purposes specified.

6. In a meat-cutting device, the shell A, provided interiorly with a series of inclined threads having smooth surfaces, and the conveyer E, rotating within the shell and provided with wings $E^2$ in conjunction with said threads, the grooves or corrugations between the projections or wings $E^2$ narrowing as they approach the discharging end of the conveyer, and plate H, fixed to the conveyer and rotated therewith, the knife I, having inclined blades whose cutting-surfaces bear against the comb J, said comb J having apertures J', and the knife K outside of the comb and having its cutting-surface in contact with the exterior surface of the comb, the knives K and I being rotated by shaft L independent of and in the opposite direction to the rotation of the conveyer, substantially as and for the purposes specified.

7. In a meat-cutting device, the shell A, provided interiorly with a series of inclined threads having smooth surfaces, and the conveyer E, rotating within the shell and provided with wings $E^2$ in conjunction with said threads, the grooves or corrugations between the projections or wings $E^2$ narrowing as they approach the discharging end of the conveyer, and plate H, fixed to the conveyer and rotated therewith, the knife I, having inclined blades whose cutting-surfaces bear against the plate H, the comb J, having apertures J', and the knife K outside of the comb and having its cutting-surface in contact with the exterior surface of the comb, the knives K and I being rotated by shaft L independent of and in the opposite direction to the rotation of the conveyer, and a preliminary cutting-knife B', located at the junction of the hopper and the shell, substantially as and for the purposes specified.

8. In a cutter, the shell A, having a rotating knife-plate H, a propeller-knife I, having inclined blades whose cutting-edges bear against the cutting-plate H, and a comb J, adjustable longitudinally in said shell, having apertures J', and the rear end of the blades of knife I moving in close proximity to the said comb, substantially as and for the purposes specified.

GRANVILLE H. STALLMAN.

Attest:
A. L. HERRLINGER,
G. A. W. PAVER.